Feb. 2, 1954

R. A. MULLANEY

CHANGE-CYCLE INITIATING MECHANISM
FOR AUTOMATIC PHONOGRAPHS

Filed Oct. 6, 1950

2,668,058

INVENTOR.
RALPH A. MULLANEY
BY Francis W. Crotty
HIS ATTORNEY

Patented Feb. 2, 1954 2,668,058

UNITED STATES PATENT OFFICE 2,668,058

CHANGE-CYCLE INITIATING MECHANISM FOR AUTOMATIC PHONOGRAPHS

Ralph A. Mullaney, Elmwood Park, Ill., assignor to Zenith Radio Corporation, a corporation of Illinois Application October 6, 1950, Serial No. 188,677

6 Claims. (Cl. 274—1)

This invention relates to a novel change-cycle initiating mechanism for an automatic phonograph and more particularly to one actuated by a record-tracking tone arm. Although the subject mechanism may be arranged for operation in response to the position or reversal of movement of the tone arm, it is ideally suited for inclusion in a system in which the initiating mechanism responds to a change in the tone arm velocity as it tracks from the playing groove portion of a record disc to the terminating groove which has a higher pitch. For convenience, the invention will be described in that connection.

In order that wear of the record groove and of the stylus point may be minimized, transducer units have been developed which may be utilized at a relatively light stylus pressure compared with that of prior devices. One of the problems which arises as a result of reduced stylus pressure is that of insuring proper tracking of the stylus in the record groove. This is understandable since, as the stylus pressure is decreased, any force which impedes progress of the tone arm causes the stylus to ride up the side and slip out of the groove.

A force which hinders progress of the tone arm is produced by the mechanism for initiating a record-changing cycle when the tone arm tracks the lead-out or terminating portion of the record groove. Inasmuch as energy to actuate the initiating mechanism is developed from tone-arm movement, prior mechanisms utilized for this purpose require heavy stylus pressure to insure tracking in the groove. At low stylus pressures, before the required force for initiating a record-changing cycle can be attained, tracking may be impaired and operation may consequently become erratic.

Certain prior mechanisms, which do not require heavy stylus pressure, include movable elements presenting a relatively small impedance to tone-arm movement. Since these elements are readily movable, they are susceptible to displacement by extraneous inertia forces produced as a result of accidental jarring or vibration of the phonograph proper. Consequently, a change-cycle may be initiated before a playing-cycle is completed and operation of the phonograph may be impaired.

It is an object of this invention, therefore, to provide a novel change-cycle initiating mechanism for an automatic phonograph which avoids one or more of the deficiencies of the above-described arrangements.

Another object of this invention is to provide a novel change-cycle initiating mechanism which requires but a small operating force and yet is not subject to operation by extraneous forces.

Still another object of the invention is to provide a novel change-cycle initiating mechanism which is simple and inexpensive to construct and is entirely efficient and reliable in operation.

In accordance with the present invention, a change-cycle initiating mechanism for an automatic phonograph having a record-tracking tone arm and a driven element which is driven only during a record-changing cycle comprises an actuator displaceable from a normal position through an intermediate position to an actuated position in which a driving connection is completed to the driven element. A trip member associated with the actuator is movable from a first position to a second position in which it is effectively mechanically locked to the actuator. The mechanism includes means for biasing the trip member toward its first position, the biasing means being effective only when the trip member is between its first and intermediate positions. A lever is provided for engaging the trip member to displace the latter through its intermediate position toward its aforesaid second position in response to the completion of a record playing cycle by the tone arm. The mechanism further includes a striker movable along a path which intercepts the trip member when the latter is in its second position and in a direction to displace the actuator to its aforesaid actuated position. Motor driven means are provided for moving the striker along its given path.

The features of the present invention which are believed to be novel are set forth with particularity in the appended claims. The present invention itself, both as to its organization and manner of operation, together with further objects and advantages thereof may best be understood by reference to the following description taken in connection with the accompanying drawings in which:

Figure 1:
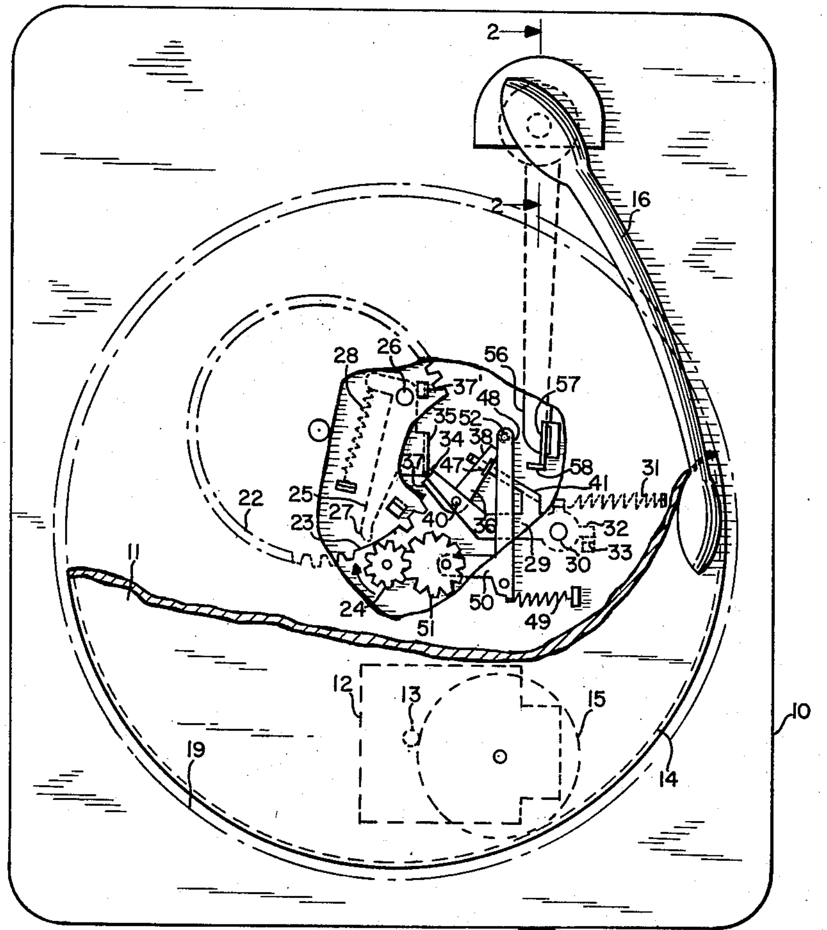
Fig. 1 is a plan view of an automatic phonograph including a change-cycle initiating mechanism embodying the present invention, a portion of the turntable and of the mounting base being shown cut away to reveal the initiating mechanism.

Referring now to Fig. 1, the phonograph there represented includes a mounting base 10 upon which a turntable 11 is supported for rotation. A driving motor 12, shown in outline, is supported by base 10 beneath turntable 11 and includes a driving shaft 13 which is mechanically coupled with the inner side of a rim 14 of the turntable through an idler gear 15. Driving motor 12 is of the synchronous, constant-speed variety and the rotational speed of turntable 11 is determined by the diameters of shaft 13 and rim 14 in well-known manner.

Figures 2, 3, 4, 5:
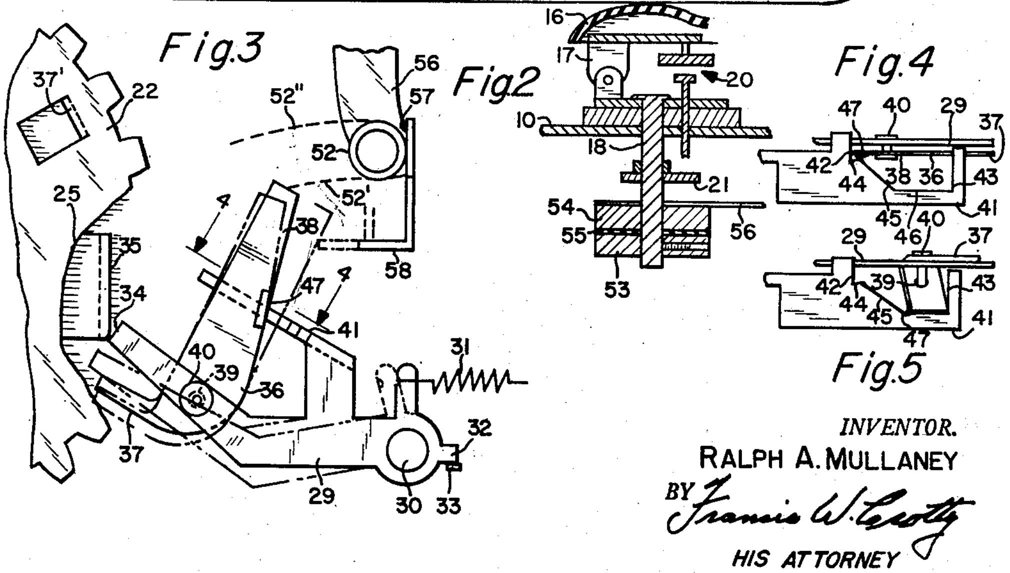
Fig. 2 is a sectional view taken along line 2—2 of Fig. 1.
Fig. 3 is an enlarged representation of a portion of the device of Fig. 1 with certain elements illustrated in another operating condition.
Fig. 4 is a sectional view taken along line 4—4 of Fig. 3.
Fig. 5 represents a view similar to that of Fig. 4 but with certain elements shown in a different operating condition.

As may be best seen in Fig. 2, a tone arm 16 is supported on base 10 for pivotal movement about a horizontal axis by a hinge 17 which is fixed to one end of a rotatably mounted, vertical shaft 18. The tone arm is arranged to track the groove of a record disc 19, shown in dash-dot outline, supported on turntable 11 and is also movable in response to actuation of a tone-arm lifting mechanism 20 and a tone-arm rotating mechanism 21 during a record-changing cycle in the usual manner.

Mechanisms 20 and 21 are coupled by suitable means (not shown) with a driven gear 22 that is rotatably supported below base 10 and provided with a gap or discontinuity 23 in its peripheral teeth. In the illustrated position of gear 22, gap 23 is adjacent a driving gear 24 supported within an opening in base 10 below and coaxial with turntable 11 for rotation therewith. A bell crank lever 25 is pivoted at 26 to the under side of mutilated gear 22 and is provided with an end portion 27 shaped essentially like one of the teeth of gear 24 and a spring 28 biases crank 25 in a direction to urge tooth 27 toward the periphery of gear 22. Means, to be described hereinafter, are provided for maintaining the crank lever in the position shown during a record-playing cycle.

Gear 24 is rotated when motor 12 rotates turntable 11, but gear 22 remains stationary in the illustrated position until crank 25 is released. When that occurs, tooth 27 is interposed between a pair of adjacent teeth of gear 24 initially to displace gear 22 and enable its teeth to mesh with gear 24. Gear 22 is thus driven and comes to rest when gap 23 once again is adjacent gear 24 at the completion of a single rotation. Such a single rotation is effected during each record-changing cycle and by means of a mechanical connection between gear 22 and the record ejector of a record magazine (not shown) positioned above turntable 11 and the connection between gear 22 and tone-arm displacing mechanisms 20 and 21 the usual movements of the tone arm and record ejector are produced in a manner generally well understood in the art. Since the functions of record ejection and tone-arm movement during the record-changing cycle are well known and, per se, constitute no part of the subject invention, a detailed description thereof is deemed unnecessary.

Briefly, after the playing of record 19 has been completed and tone arm 16 tracks into the lead-out groove portion of high pitch, crank 25 is released by the mechanism of the instant invention in a manner fully disclosed hereinafter and a change cycle is initiated. As gear 22 is driven through a single rotation, the tone arm is lifted from engagement with the groove of disc 19 and rotated outwardly from the center of the record disc and beyond the edge thereof. The record ejector then is operated to discharge a record which falls into position upon record 19. Next, the tone arm is carried inward to the starting groove portion of the new record whereupon it is lowered and playing of the new record commences.

Referring now more particularly to the mechanism embodying the present invention for the purpose of effecting displacement of element 25 to initiate a record-change cycle, as best shown in Fig. 3 this mechanism comprises an actuator 29 in the form of a bell crank lever. Lever 29 is pivoted at one end to the under side of base 10 by a rivet 30 and a spring 31 biases the lever in a clockwise direction, movement thereof being limited by a projection 32 of the lever engaging an abutment 33 extending downwardly from base 10. Actuator 29 tends to be maintained by spring 31 in a normal position, as illustrated, in which the free end or nose portion 34 is in engagement with a downwardly turned lip 35 extending from one side of bell crank 25. Thus, member 25 is maintained in the indicated position with spring 28 urging lip 35 against the end portion 34 of actuator 29. The actuator is rotatably displaceable from its normal position, against the bias of spring 31, to an actuated position, illustrated by dash-dot-dot outline in Fig. 3, in which its portion 34 is free of lip 35 whereupon spring 28 is free to displace member 25 in a counterclockwise direction to initiate the change cycle described hereinbefore.

An essentially L-shaped trip member 36 having portions 37 and 38 is provided with an aperture 39 for receiving a rivet 40 depending from actuator 29 and disposed intermediate end portion 34 and rivet 30. This mounting including aperture 39 and rivet 40 permits member 36 to move in a rotational direction as well as in a tilting direction in which section 38 is vertically displaceable. Accordingly, trip member 36 is supported by actuator 29 for rotational movement from a first position, indicated in full lines in Fig. 1 in which section 37 is along side the body of actuator 29, through an intermediate position, to a second position indicated in full lines in Fig. 3.

A further support for trip member 36 is provided by an element 41 which extends parallel to the portion of actuator 29 including rivet 40 and is affixed at one end to the actuator. As may be best observed in Fig. 4, element 41 includes a cut-away edge portion terminating in oppositely disposed abutments 42 and 43. Section 38 of trip member 36 projects across this cut-away portion of element 41 so that the stop abutments 42 and 43 determine the aforesaid first and second positions, respectively, of the trip lever.

The cut-away portion of element 41 further includes a pair of inclined surfaces 44 and 45 which slope downwardly in opposite senses from a junction which junction determines an intermediate position for trip member 36. Surface 44 extends toward and terminates at abutment 42, whereas surface 45 extends toward abutment 43 and is connected thereto by a horizontal section 46. A downward projection 47 of section 38 rides along surfaces 44 and 45 and, in view of the slopes of those surfaces, when the trip member is between its first and intermediate positions it is rotatively biased toward abutment 42 but when the trip member is between its intermediate and second positions it is rotatively biased toward abutment 43. This arrangement effectively provides bi-directional biasing means for the trip lever to urge it toward its first and toward its second positions depending upon its disposition with relation to its first, intermediate and second positions. The length of surface 44 is substantially smaller than the length of surface 45 so that trip member 36 need be rotated only a small amount from its first position in order that it be further rotated, by lip 47 riding down incline 45, to its second position as shown in Fig. 5.

For resetting trip member 36 to its first position against abutment 42, there is provided a reset finger 37' which projects downwardly from gear 22 to engage the tip of section 37 as gear 22 nears the completion of a single revolution.

Referring once again to Fig. 1, a lever 48 is pivoted at one end to the upper side of base 10 and is rotatably biased in a counterclockwise direction by a spring 49. An arm 50 extends from one side of lever 48 and carries at its free end a stud on which an eccentric gear 51 is rotatably supported. Gear 51 meshes with gear 24 so that pivoted arm 48 oscillates in response to rotation of gear 24. A stud 52 projecting downwardly from the free end of pivoted lever 48 constitutes a striker which strikes certain components of the change-cycle initiating mechanism as will be explained more fully hereinafter. The path of the striker as lever 48 is oscillated by gears 24 and 51 is represented by the arcuate lines 52' and 52''. Preferably, striker 52 is covered with a soft material, such as vinyl, to cushion its blows on and insure engagement with the components driven thereby.

Referring again to Fig. 2, a retaining member 53 is fixed to the lowermost end of tone-arm shaft 18 and a weight 54 is rotatably supported on shaft 18 above member 53. A sliding-friction element 55, composed of a material such as felt, is interposed between member 53 and weight 54 so that a lever 56 which is fixed to weight 54 is movable with the tone arm in response to inward tone arm displacement but may, nevertheless, be moved relative to the tone arm in the opposite direction. An upwardly turned ear 57 disposed at the free end of lever 56 is positioned in the path of movement of striker 52 and an L-shaped member 58 is fixed to ear 57 to engage trip member section 38 in response to a certain displacement of lever 56 with inward tone-arm movement as will be more apparent from the following discussion.

In describing the operation of the change-cycle initiating mechanism, let it be assumed that turntable 11 is rotated at a velocity suitable for playing record 19 and that tone arm 16 has been positioned to engage the information-carrying portion of the record groove. For this operating condition, gear 22 is stationary with its tooth discontinuity 23 facing the driven gear 24 as represented in Fig. 1. Moreover, actuator 29 is in its normal position with end portion 34 in engagement with projection 35 of bell crank 25 to maintain the section 27 of the bell crank out of contact with rotating gear 24. Also, trip member 36 is biased to its first position against stop abutment 42 as indicated in Fig. 4 so that the change-cycle initiating mechanism is at rest which, of course, is required during the playing of record 19. As the tone arm tracks inwardly with the groove, lever 56 follows along and is rotated in a clockwise direction at constant velocity. At the same time, the driving engagement of gear 24 with gear 51 causes lever 48 to oscillate striker 52 along its path of movement. The ratio of gears 24 and 51 is so selected that striker 52 engages projection 57 of lever 56 periodically to drive this lever in a counterclockwise direction with a periodicity to prevent lever 56 from initiating a record-changing cycle. More specifically, the action of striker 52 in striking lever 56 prevents the extension 58 from engaging trip member section 38 so that the trip member remains in its first or at-rest position adjacent stop abutment 42.

When tone arm 16 tracks into the broad-pitched terminating groove portion of record 19, its velocity and that of lever 56 is greatly increased and before lever 56 can be displaced by striker 52, the lever moves into its tripping position with member 58 engaging trip member section 38, as indicated in Fig. 3 by partial dash-dot outline of these members. As a consequence, trip member 36 is rotated in a counterclockwise direction (Figs. 1, 3) from its first position through its intermediate position. Once this slight movement of trip member 36 is effected, the projection 47 of the trip member slides down incline 45 further to rotate trip member 36 into its second position (Fig. 5) in which it engages abutment 43 effectively to lock trip member 36 to actuator 29 for concurrent rotation in this same direction.

When member 36 is in its second position, the free end of section 38 is in the path of striker 52 and is engaged by the striker when it travels in a direction toward mutilated gear 22. Since member 36 is locked to actuator 29, these elements move together about pivot 30 to their respective positions shown in dash-dot-dot outline in Fig. 3. The displacement of actuator 29 into its actuated position releases bell crank 25 for rotation by spring 28 and initiates the record-changing cycle described above.

Once trip member 36 is carried through its intermediate position, initiation of a record-changing cycle is inevitable inasmuch as the trip member is gravity-biased toward its second position. Should the trip member arrive at its second position at the time striker 52 is at the portion of its stroke nearest gear 22, the trip-member section 47 is driven up the inclined surface 45 by the striker. However, section 47 rides only part of the way up incline 45 because the entire trip member rotates and clears the striker and thereafter automatically returns to its second position. Initiation of the record-changing cycle then occurs with the return stroke of the striker.

During the changing cycle effected by rotation of gear 22, tone arm 16 is carried in a direction away from the center of turntable 11 and lever 56 is returned to a normal position clear of the trip member. As gear 22 nears the completion of a single revolution, reset finger 37' engages the free end of trip member section 37 and displaces trip member 36 from its second position to its first position, projection 47 of section 38 being driven up incline 45 onto incline 44 at about the same time, spring 31 rotates actuator 29 in a clockwise direction and the end portion of the actuator engages surface 35 of bell crank 25 and restores the crank into its quiescent position as gear 22 comes to rest with its discontinuity facing gear 24.

Trip member 36 may be constructed of very light weight material and is of a small size so that it does not impede displacement of tone arm 16 to any great extent. Therefore, the device is operative at light stylus pressures. At the same time, since member 36 is of light weight, no substantial force is required of tone arm 16 to carry lip 47 up the short incline 44. Inasmuch as trip member 36 is biased toward its first position by incline 44, jarring of the phonograph proper which may otherwise tend to displace the trip member does not initiate a record-change cycle unless a severe blow is struck, for if the trip member is vibrated from engagement with abutment 42 into any position wherein lip 47 engages incline 44, the biasing effect returns the trip member to its first position.

Although trip member 36 is releasably locked in its first position, it is readily movable through its intermediate position and presents the only impedance to tone-arm movement. The larger force that is required to complete initiation of a record-change cycle is supplied by motor 12 through the agency of the motor driven striker 52.

While a particular embodiment of the present invention has been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A change-cycle initiating mechanism for an automatic phonograph having a record-tracking tone arm and a driven element which is driven only during a record-changing cycle, said initiating mechanism comprising: an actuator displaceable from a normal position to an actuated position in which a driving connection is completed to said driven element; a trip member movable from a first position through an intermediate position to a second position in which said member is effectively mechanically locked to said actuator; means for biasing said trip member toward said first position, said biasing means being effective only when said member is between said first and intermediate positions; a lever for engaging said trip member to displace said member through said intermediate position and toward its aforesaid second position in response to the completion of a record-playing cycle by said tone arm; a striker movable along a given path which intercepts said trip member when the latter is in its aforesaid second position and in a direction to displace said actuator to its aforesaid actuated position; and motor-driven means for moving said striker along said path.

2. A change-cycle initiating mechanism for an automatic phonograph having a record-tracking tone arm and a driven element which is driven only during a record-changing cycle, said initiating mechanism comprising: an actuator displaceable from a normal position to an actuated position in which a driving connection is completed to said driven element; a trip member movable from a first position through an intermediate position to a second position in which said member is effectively mechanically locked to said actuator; means for biasing said trip member toward said second position, said biasing means being effective only when said member is between said intermediate and second positions; a lever for engaging said trip member to displace said member through said intermediate position and toward its aforesaid second position in response to the completion of a record-playing cycle by said tone arm; a striker movable along a given path which intercepts said trip member when the latter is in its aforesaid second position and in a direction to displace said actuator to its aforesaid actuated position; and motor-driven means for moving said striker along said path.

3. A change-cycle initiating mechanism for an automatic phonograph having a record-tracking tone arm and a driven element which is driven only during a record-changing cycle, said initiating mechanism comprising: an actuator displaceable from a normal position to an actuated position in which a driving connection is completed to said driven element; a trip member movable from a first position through an intermediate position to a second position in which said member is effectively mechanically locked to said actuator; bi-directional biasing means coupled to said trip member urging said member toward said first position only when said member is between said first and intermediate positions and urging said member toward said second position only when said member is between said intermediate and second positions; a lever for engaging said trip member to displace said member through said intermediate position and toward its aforesaid second position in response to the completion of a record-playing cycle by said tone arm; a striker movable along a given path which intercepts said trip member when the latter is in its aforesaid second position and in a direction to displace said actuator to its aforesaid actuated position; and motor-driven means for moving said striker along said path.

4. A change-cycle initiating mechanism for an automatic phonograph having a record-tracking tone arm and a driven element which is driven only during a record-changing cycle, said initiating mechanism comprising: an actuator displaceable from a normal position to an actuated position in which a driving connection is completed to said driven element; a trip member movable from a first position through an intermediate position to a second position in which said member is effectively mechanically locked to said actuator; a support for said trip member including a pair of inclined surfaces sloping in opposite directions from a section defining said intermediate position and toward said first and second positions, respectively to bias said trip member toward said first position when said member is between said first and intermediate positions and toward said second position when said member is between said intermediate and second positions; a lever for engaging said trip member to displace said member through said intermediate position and toward its aforesaid second position in response to the completion of a record-playing cycle by said tone arm; a striker movable along a given path which intercepts said trip member when the latter is in its aforesaid second position and in a direction to displace said actuator to its aforesaid actuated position; and motor-driven means for moving said striker along said path.

5. A change-cycle initiating mechanism for an automatic phonograph having a record-tracking tone arm and a driven element which is driven only during a record-changing cycle, said initiating mechanism comprising: an actuator displaceable from a normal position to an actuated position in which a driving connection is completed to said driven element; a trip member movable from a first position through an intermediate position to a second position; a support for said trip member mechanically coupled to said actuator, including a pair of surfaces sloping in opposite directions from a section defining said intermediate position and toward said first and second positions, respectively to bias said trip member toward said first position when said member is between said first and intermediate positions and toward said second position when said member is between said intermediate and second positions, and said support further including a stop abutment defining said second position for said trip member to effectively mechanically lock said member to said actuator; a lever for engaging said trip member to displace said member through said intermediate position and toward its aforesaid second position in response to the completion of a record-playing cycle by said tone arm; a striker movable along a given path which intercepts said trip member when the latter is in its aforesaid second position and in a direction to displace said actuator to its aforesaid actuated position; and motor-driven means for moving said striker along said path.

6. A change-cycle initiating mechanism for an automatic phonograph having a record-tracking tone arm and a driven element which is driven only during a record-changing cycle, said initiating mechanism comprising: an actuator displaceable from a normal position to an actuated position in which a driving connection is completed to said driven element; a trip member movable from a first position through an intermediate position to a second position in which said member is effectively mechanically locked to said actuator, the distance between said first and intermediate positions being substantially smaller than that between said intermediate and second positions; bi-directional biasing means coupled to said trip member urging said member toward said first position only when said member is between said first and intermediate positions and urging said member toward said second position only when said member is between said intermediate and second positions; a lever for engaging said trip member to displace said member through said intermediate position and toward its aforesaid second position in response to the completion of a record-playing cycle by said tone arm; a striker movable along a given path which intercepts said trip member when the latter is in its aforesaid second position and in a direction to displace said actuator to its aforesaid actuated position; and motor-driven means for moving said striker along said path.

RALPH A. MULLANEY.

References Cited in the file of this patent

UNITED STATES PATENTS

| Number | Name | Date |
|---|---|---|
| 2,300,668 | Habeggar | Nov. 3, 1942 |
| 2,330,293 | Knox | Sept. 28, 1943 |
| 2,539,409 | Erbe | Jan. 30, 1951 |
| 2,568,496 | Hall | Sept. 18, 1951 |